United States Patent [19]

Precht

[11] Patent Number: 5,063,837
[45] Date of Patent: Nov. 12, 1991

[54] BEVERAGE BREWING APPARATUS WITH DRIP PREVENTING MECHANISM

[75] Inventor: Hans-Jürgen Precht, Solingen, Fed. Rep. of Germany

[73] Assignee: Robert Krups Stiftung & Co. KG, Solingen, Fed. Rep. of Germany

[21] Appl. No.: 574,341

[22] Filed: Aug. 28, 1990

[30] Foreign Application Priority Data

Aug. 31, 1989 [DE] Fed. Rep. of Germany ....... 3928785

[51] Int. Cl.$^5$ ............................................. A47J 31/24
[52] U.S. Cl. ......................................... 99/295; 99/299
[58] Field of Search ................. 99/295, 299, 306, 300, 99/302 R, 304, 305, 307, 316; 426/433

[56] References Cited

U.S. PATENT DOCUMENTS

| | | | |
|---|---|---|---|
| 4,667,587 | 5/1987 | Wunder | 99/299 |
| 4,790,240 | 12/1988 | Henn | 99/282 |
| 4,811,657 | 3/1989 | Rixen | 99/295 |
| 4,843,955 | 7/1989 | Henn | 99/295 |
| 4,888,465 | 12/1989 | Hoffmann | 219/301 |
| 4,888,466 | 12/1989 | Hoffmann | 219/301 |
| 4,888,467 | 12/1989 | Hoffmann | 210/301 |
| 4,889,041 | 12/1989 | Mahlich | 99/285 |
| 4,893,552 | 1/1990 | Wunder | 99/299 |
| 4,920,868 | 5/1990 | Gehrmann | 99/279 |

FOREIGN PATENT DOCUMENTS

| | | |
|---|---|---|
| 0091634 | 11/1985 | Austria . |
| 0019291 | 3/1983 | European Pat. Off. . |
| 0328744 | 8/1989 | European Pat. Off. . |
| 2605957 | 6/1978 | Fed. Rep. of Germany . |
| G8437676 | 1/1987 | Fed. Rep. of Germany . |
| 7829547 | 5/1980 | France . |

*Primary Examiner*—Robert W. Jenkins
*Attorney, Agent, or Firm*—Peter K. Kontler

[57] ABSTRACT

A coffee maker or another beverage brewing apparatus wherein a holder for flavoring agent or a filter in the holder has one or more valve-controlled outlets for gravitational descent of freshly brewed beverage into an open-top vessel beneath the holder. The top of the vessel has a rim and a spout which extends to a level below the rim. In order to automatically open the valve which controls the outlet or outlets, the holder or the housing of the apparatus carries a movable actuator which is engaged by the rim, irrespective of the orientation of the spout, and opens the valve as soon as the open top of the vessel is properly positioned beneath the outlet or outlets. The actuator has a rim-engaging follower the effective length of which in the circumferential direction of the open top of the vessel at least equals but normally exceeds the width of the spout. This ensures that the follower is engaged by the rim in any selected orientation of the vessel. The actuator can be reciprocably or pivotably mounted on the housing, on a container for liquid or on the holder.

34 Claims, 5 Drawing Sheets

BEVERAGE BREWING APPARATUS WITH DRIP PREVENTING MECHANISM

BACKGROUND OF THE INVENTION

The invention relates to improvements in apparatus for brewing hot beverages, such as coffee, tea, chocolate and soups. More particularly, the invention relates to improvements in apparatus of the type wherein freshly brewed beverage is caused to descend, normally by gravity flow, from a holder into a vessel (such as a coffee pot or a tea pot) which is supported at a level below the holder. Still more particularly, the invention relates to improvements in mechanisms which are used to prevent hot beverage from dripping onto parts of the apparatus below the outlet or outlets of the holder when the beverage-collecting vessel is not in place and/or when the holder is moved to a position away from alignment with a vessel on its support.

An electric coffee maker normally comprises a housing which carries or embodies a container for a supply of fresh water and which contains an electric water heater. Cold water is conveyed from the container through or past the heater, and the thus heated water is caused to flow up a riser and into a holder for a filter wherein the water contacts a flavoring agent (e.g., a metered quantity of comminuted coffee beans). The resulting beverage is discharged by way of one or more outlets in the bottom of the filter and is gathered in a vessel (e.g., a coffee pot made of glass or plastic material) which is positioned on a support beneath the holder. The outlet or outlets are controlled by one or more valves which must be opened when the vessel is maintained in proper position beneath the holder in order to establish one or more paths for the flow of coffee from the holder into the vessel. In order to automate the opening of the valve or valves, the cover for the coffee pot is caused to cooperate with an actuator which is installed in or on the housing of the coffee maker and is engaged by the cover of a properly positioned coffee pot to thereby open the valve or valves The outflowing beverage must pass through a centrally located opening in the cover of the properly positioned coffee pot.

The reason that the valve or valves are not opened directly by the coffee pot (instead of by the cover) is that, as a rule, the pot is provided with a spout which extends downwardly below a rim surrounding the major part of the open top of the pot. If the coffee maker employs a lever-like actuator which is pivotable relative to the housing or relative to the holder in order to open or close the valve or valves, the lever is likely to overlie the spout of a properly positioned pot. This enables the lever to assume a position in which the valve or valves are closed even though the pot is ready to receive freshly brewed hot coffee. If the lever (or an otherwise configurated actuator) is positioned and dimensioned to be pivoted by the cover, the orientation of the spout on the pot below the holder for the coffee filter is of no consequence, i.e., the spout can extend in any desired direction without affecting the cooperation between the cover and the actuator. Of course, if the pot does not have a spout, the actuator can include a narrow lever which is engaged by the rim of a cup or pot beneath the holder to maintain the valve or valves in open position. In such coffee makers, the angular position of the pot or cup is of no consequence. Reference may be had to commonly owned U.S. Pat. Nos. 4,790,240 and 4,843,955 respectively granted Dec. 13, 1988 to Henn et al. and July 4, 1989 to Henn et al. Commonly owned U.S. Pat. No. 4,811,657 (granted March 14, 1989 to Rixen) discloses a valve adapted to be opened by a pivotable actuator which is located in the path of the cover on top of a vessel. The actuator opens the valve as soon as it is engaged by the cover of a properly positioned coffee pot or another suitable vessel. The cover has an opening which enables hot coffee to flow from the filter holder into the interior of the vessel.

Proper sealing of the outlet or outlets when the pot is not in position to receive hot beverage is important and highly desirable because the outflowing beverage could contaminate the warming plate for the pot and/or penetrate into the interior of the housing to cause damage to various electrical and electronic components which are normally installed in the hollow base of the housing. Therefore, the valve or valves include springs which bias the valving element or elements to operative or sealing position(s) and are free to dissipate energy as soon as the pot is removed from its support or is shifted along the support to a position in which it is unable to intercept a stream or discrete droplets of hot beverage. Penetration of droplets of hot beverage into the base of the housing can be prevented only by resorting to costly and complex sealing devices. Moreover, dried beverage on the upper side of the warming plate and/or on other exposed surfaces of the coffee maker detracts from the appearance of such apparatus.

Heretofore known actuators for the valve or valves which control the outflow of hot beverage from the filter holder of a coffee maker or a like beverage brewing apparatus normally comprise a one-armed lever or a two-armed lever. A two-armed lever is normally used in apparatus wherein the filter holder is pivotably or reciprocably mounted on the upper portion of the housing. Such movability of the holder is often desirable because a holder which has been pivoted or otherwise moved from operative position affords convenient access to the filter and to the filter bag therein. On the other hand, one-armed levers are used in coffee makers and like apparatus wherein the holder is fixedly mounted in the housing so that access to a filter therein can be gained by pivoting a closure or lid at the top of the housing to open position.

Practically all heretofore known coffee makers are designed in such a way that the actuator for valve or valves in the holder is pivoted by a cover of the coffee pot. Reference may be had again to U.S. Pat. No. 4,811,657 to Rixen. It is also known to provide the central portion of the cover with a substantially hemispherical external protuberance which directly engages a valve at the underside of the holder when the pot is properly positioned with reference to the holder. The valve closes as soon as the protuberance of the cover is moved away, i.e., as soon as the pot is shifted relative to the warming plate on the base of the housing of the coffee maker. The means for automatically closing the valve includes a spring which stores energy while the valve is directly engaged by the protuberance of the properly positioned cover. The spring ensures that the valve cannot jam in the open position and invariably seals the outlet or outlets of the holder as soon as the pot is no longer in position to intercept the hot beverage.

It is further known to indirectly influence a lever which serves to open a valve in the holder in response to proper positioning of the coffee pot below the holder.

The utilization of a cover or lid as a means for directly or indirectly opening a valve in the holder of a coffee maker or a like machine exhibits certain serious drawbacks. Thus, it is necessary to employ a relatively strong and stiff cover because a weaker and more readily deformable cover could yield to the pressure of the spring or springs which are used to normally maintain the valve or valves in closed position(s). A deformed cover is incapable of reliably opening the valve or valves when the pot is in proper position for reception of hot beverage. The utilization of weaker springs is not a satisfactory solution because a weaker spring might not be able to reliably close the valve when the cover is disengaged from the valve or from an actuator (e.g., a one-armed of multi-armed lever) for the valve. A flexible cover contributes to greater tolerances between relatively movable parts. Such tolerances are compounded with certain other tolerances, e.g., those which are unavoidable when a coffee pot is made of glass or another non-metallic material. The just discussed tolerances are much less troublesome if the coffee pot is furnished with a rigid cover, i.e., with a relatively heavy and bulky cover which, in turn, is undesirable for many other reasons. Moreover, an overly rigid cover is likely to damage the valve or the actuator.

Another drawback of the aforediscussed conventional beverage brewing apparatus is that the valve or valves in the holder cannot be opened if the cover is misplaced or destroyed. This can result in overfilling of the holder and in overflowing of hot beverage from the holder.

French Pat. No. 2 439 042 to SEB S.A. discloses a coffee maker wherein the vessel for gathering a freshly brewed beverage comprises a cover with a centrally located opening. The holder above the support for the vessel carries a small pivotably mounted receptacle which prevents dripping of hot beverage from the holder onto the support for the vessel when the vessel is moved off the support. The receptacle is held in liquid-collecting position under the action of gravity but is tilted by the vessel when the latter is moved onto its support beneath the holder for flavoring agent. The bottom wall of the receptacle carries a downwardly extending projection in the form of a tooth which is to be engaged by the cover of the oncoming vessel in order to tilt the receptacle and to thus establish an unobstructed path for the flow of freshly brewed beverage from the interior of the holder into the vessel below it. If the vessel is moved toward a proper position on the support in a particular direction, the spout in the rim at the top of the vessel is likely to engage the projection of the receptacle before the projection comes into actual engagement with the cover. The width of the projection is a small fraction of the width of the spout. At any rate, the receptacle is maintained in tilted position only by the cover not later than when the movement of the vessel onto its support beneath the holder is completed. The projection engages the surface bounding the spout only if the vessel is introduced into the apparatus at right angles to the direction which is indicated by arrow F1 in FIG. 4 of the French reference.

Published European patent application No. 0 019 291 of Lemoine discloses a coffee maker wherein the valve in the bottom part of the holder for a filter is opened by the cylindrical wall of a coffee pot in response to movement of the pot to a position beneath the holder. The lower portion of the cylindrical wall of the pot pivots a lever which, in turn, pivots the valving element on one arm of a bell crank lever to open or inoperative position. Neither the top of the pot nor the cover at the top of the pot is used as a means for opening the valve in response to proper positioning of the pot on its support so that the pot is ready to receive a stream of hot beverage which first impinges upon the cover and thereupon descends into the pot by way of a central opening in the cover.

Published European patent application No. 0 328 744 of Wunder et al. discloses a coffee maker wherein the opening of the valve at the lower end of the holder takes place in two stages. The first stage involves insertion of the holder into the housing whereby a lever of the holder pivots as a result of engagement with a cam in the housing and a portion of the lever moves into the path of advancement of the coffee pot toward its operative or beverage-receiving position. The cover of the pot then engages and pivots the lever so that the latter opens the valve and permits hot beverage to flow from the interior of the holder into the pot.

German Auslegeschrift No. 26 05 957 of Arbter et al. discloses a coffee maker wherein a follower tracks a specially configured cover at the top of a pot which is being moved toward operative position below the filter holder. The cover pivots the follower so that the latter opens the valve at the lower end of the holder and permits hot beverage to descend into the pot. The cover has a central opening for the beverage.

German Utility Model No. 84 37 676.7 of Bosch-Siemens describes a coffee maker wherein the valve for the outlet at the bottom end of the filter holder is mounted on a lever which can be pivoted by the coffee pot. The reference further discloses a mechanism which can be operated to raise or lower the filter holder. The detailed description does not mention a cover for the pot; however, the introductory part of the reference states that the apparatus of Bosch-Siemens is an improvement over apparatus of the type wherein a sensor or actuator cooperates with the cover of a coffee pot. Bosch-Siemens specifically refers to German Utility Model No. 76 04 370.

Published European patent application No. 0 091 634 of Amiot describes a coffee maker wherein the valve at the bottom of the filter holder can be opened to a greater or lesser extent, i.e., the freshly brewed hot beverage can flow into the pot at a faster rate or at a slower rate. The actuator for the valve is moved by the cover at the top of the coffee pot.

OBJECTS OF THE INVENTION

An object of the invention is to provide a beverage brewing apparatus wherein the vessel for reception of freshly brewed beverage from the filter holder need not carry a cover in order to permit proper actuation of a valve which controls the flow of beverage from the holder into the vessel.

Another object of the invention is to provide an apparatus wherein a cover, even if used to overlie the top of the vessel for hot beverage, cannot and need not influence the condition of the valve which controls the outflow of hot beverage from the filter holder.

A further object of the invention is to provide an apparatus wherein the valve or valves of the holder are opened and closed in a novel and improved way as a result of movement of a coverless vessel to and from the beverage-receiving position.

An additional object of the invention is to provide an apparatus which is operative as long as the person in charge can find a vessel for collection of freshly brewed coffee, tea or another hot beverage.

Still another object of the invention is to provide an apparatus wherein the presence of a spout on the vessel for collection of hot beverage cannot influence the operation of the mechanism which prevents dripping of hot beverage from the holder when the vessel for collection of hot beverage is out of position.

A further object of the invention is to provide an apparatus wherein the loss or misplacement of a cover for the vessel does not affect the operation of the drip preventing mechanism.

Another object of the invention is to provide a drip preventing mechanism which can operate properly in an apparatus with a stationary or mobile holder for flavoring agent.

An additional object of the invention is to provide an apparatus wherein the rim of an open-top vessel for collection of hot beverage can be used to perform one or more useful functions.

A further object of the invention is to provide an apparatus wherein the drip preventing mechanism can be operated by an inseparable part of the beverage collecting vessel.

Another object of the invention is to provide an apparatus wherein excessive accumulations of hot beverage in and overflow of hot beverage from the holder for flavoring agent are prevented in a novel and improved way.

An additional object of the invention is to provide an apparatus which is simpler and less expensive but more reliable than heretofore known apparatus for brewing hot beverages.

SUMMARY OF THE INVENTION

The invention is embodied in an apparatus for brewing hot beverages (such as coffee, tea, chocolate or soup) by contacting a heated liquid with a flavoring agent. The improved apparatus comprises a housing including a support (preferably including a warming plate), a liquid-confining container which is carried by the housing and can constitute a detachable or an integral part of the housing, a holder which serves to receive a supply of flavoring agent (such as comminuted coffee beans, tea leaves or pulverulent chocolate) and is movably or fixedly mounted on the housing and has an outlet which is located above and is spaced apart from the support, liquid heating means in the housing (preferably in the form of an electric heater which can raise the temperature of successive increments of a flowing stream of liquid), means for conveying heated liquid from the heating means to the holder so that the heated liquid contacts the flavoring agent and the resulting beverage tends to leave the holder by way of the outlet, a valving element which is movable with reference to the holder between first and second positions in which the outlet is respectively sealed and exposed, and a vessel which is movable (normally by hand) onto and off the support. The vessel has a top, a rim which surrounds the major part of the top and a spout which is provided in and extends downwardly from the rim. The improved apparatus further comprises means for moving the valving element to the second position (in which the outlet of the holder is exposed to permit evacuation of beverage by gravity flow) in automatic response to placing of the vessel onto the support (i.e., the outlet remains sealed until and unless the vessel is placed onto the support so that its top is located beneath the outlet). The moving means comprises a mobile actuator which is directly or indirectly carried by the housing and directly contacts the rim from above irrespective of the orientation of the spout while the vessel rests on the support. Thus, the actuator is dimensioned and/or otherwise configured in such a way that it directly engages the rim as soon and as long as the vessel rests on the support, irrespective of the angular position of the vessel, i.e., irrespective of the direction in which the spout extends. For example, if the vessel is moved onto and is deposited on the support in such orientation that the spout confronts the actuator, the actuator preferably engages the rim at one or both sides of the spout, i.e., the dimensions of the actuator are such that it can engage the rim at one or more points (namely at one side or at two opposite sides of the spout) even when the spout is held in a position in which it is directly overlapped by the actuator.

The housing (namely the housing proper or a part (such as the holder) which is mounted on or forms an integral part of the housing) can be provided with guide means for the actuator. The actuator is or can be mounted for reciprocatory movement along the guide means.

The width of the spout in the circumferential direction of the top of the vessel is preferably less or at most equals the width of the actuator, i.e., the length (as measured in the circumferential direction of the top of the vessel on the support) of the actuator matches or exceeds the width of the spout. This enables the actuator to directly engage the rim in each orientation of the spout relative to the housing, the support of the housing and the holder on the housing.

The actuator can be provided with a substantially flat underside which contacts the rim of the vessel on the support. In accordance with one presently preferred embodiment, the actuator includes a rim-contacting section or follower and a carrier for the rim-contacting section. The carrier is movably carried by the housing (e.g., for reciprocatory movement along the aforediscussed guide means or for pivotal movement about a substantially horizontal axis). The carrier is or can be rigid (e.g., integral) with the rim-contacting section. Such section can include a wedge-like member having an underside which contacts the rim when the vessel is placed onto the support. The wedge-like member has an edge which is movable to a lower end position at a predetermined distance from (i.e., at a predetermined level above) the support. The rim of the vessel on the support is located at a lesser second distance from the support when the vessel is placed onto the support, i.e., the underside of the wedge-like member overlies at least a portion of and contacts the rim.

The container has a wall which is adjacent the support, and such wall can be provided with or located in front of an upright recess. The wall is further provided with guide means adjacent the recess, and the carrier is disposed in the recess and is movable up and down along the guide means. The rim-contacting section on the thus installed carrier is outwardly adjacent the wall of the container. The wall has a slot which communicates with the recess, and the rim-contacting section extends through the slot. The housing has an upper portion which carries the holder and a lower portion which includes or carries the support. The lower portion includes a top wall beneath the recess behind the wall of the container, and the carrier for the rim-contacting section is movable in the recess up and down to and from a lower end position in which it abuts the top wall and thus maintains the rim-contacting section in an optimum position to have its underside engaged by the rim of a vessel which is being moved along the support toward a position in which the top of the vessel is located beneath and can receive hot beverage from the outlet of the holder.

Instead of using an actuator with a carrier which is reciprocable in a recess behind the wall of the liquid-receiving container, the improved apparatus can comprise means for pivotally connecting the actuator to the housing. The housing can be provided with a small chamber or niche for the connecting means. The pivotable actuator can resemble or constitute a substantially flat wedge which is disposed in a substantially vertical plane, and the connecting means preferably defines for the actuator a substantially horizontal pivot axis.

The valving element can include an extension which is movably mounted on the holder, and such apparatus further comprises means for yieldably biasing the extension against the actuator and means for connecting the extension to the holder, preferably in such a way that the extension is pivotable about a substantially horizontal axis. The extension includes a portion which is remote from the connecting means and is acted upon by the biasing means. Such portion of the extension can be received in a socket (e.g., in a substantially vertical slot) of the holder when the vessel is placed onto the support. The biasing means can include a spring which reacts against the holder and/or against the housing and bears against the extension. The holder and/or the housing can be provided with a retainer for the spring.

The apparatus can operate without the aforediscussed extension of the valving element and then preferably comprises means for pivotally mounting the actuator for movement relative to the housing and relative to the holder. The actuator has a follower which is remote from the mounting means and engages the rim when the vessel rests on the support. Such actuator can be used with advantage in apparatus wherein the holder is carried by the housing in a single predetermined position. The mounting means preferably defines for the actuator a substantially horizontal pivot axis and, in accordance with a first embodiment, the follower of the actuator includes an elongated rod-like member which is substantially parallel to the pivot axis for the actuator. Such actuator preferably further comprises a lever which is or can be located in a substantially vertical plane and is pivotable about the axis which is defined by the mounting means. The follower is carried by and extends from the lever at both sides of the vertical plane. The width of the spout in the circumferential direction of the top of the vessel on the support is less than or at most equals the overall length of the rod-shaped member.

Alternatively, the follower can include two substantially mirror symmetrical wings at opposite sides of the lever. The wings are disposed between the free end or tip of the lever and the mounting means and have undersides which are preferably at least substantially coplanar with the underside of the lever. The combined length of the wings preferably at least equals or exceeds the width of the spout as measured in the circumferential direction of the top of the vessel on the support. Each wing can have a substantially plane rim-contacting underside, an end which is remote from the lever, and a preferably concave upper side which slopes toward the underside in a direction from the lever toward the respective end.

Still further, the follower can constitute a panel or plate which is rigid with the lever at a locus remote from the mounting means for the lever. The panel has portions which are located at opposite sides of the lever, and the combined length of the two portions at least equals but can exceed the width of the spout as measured in the circumferential direction of the top of the vessel on the support.

The lever of the actuator can be provided with a retainer which is remote from the mounting means and can center and support and guide one end of a spring (e.g., a helical spring) which reacts against the housing and/or against the holder and biases the lever in a direction to maintain the rod-shaped or winged or plate-like follower in contact with the rim of the vessel on the support.

The holder can be provided with an elongated guide slot for the free end or tip of the lever, i.e., for that end of the lever which is remote from the mounting means. The follower is located between the tip and the mounting means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
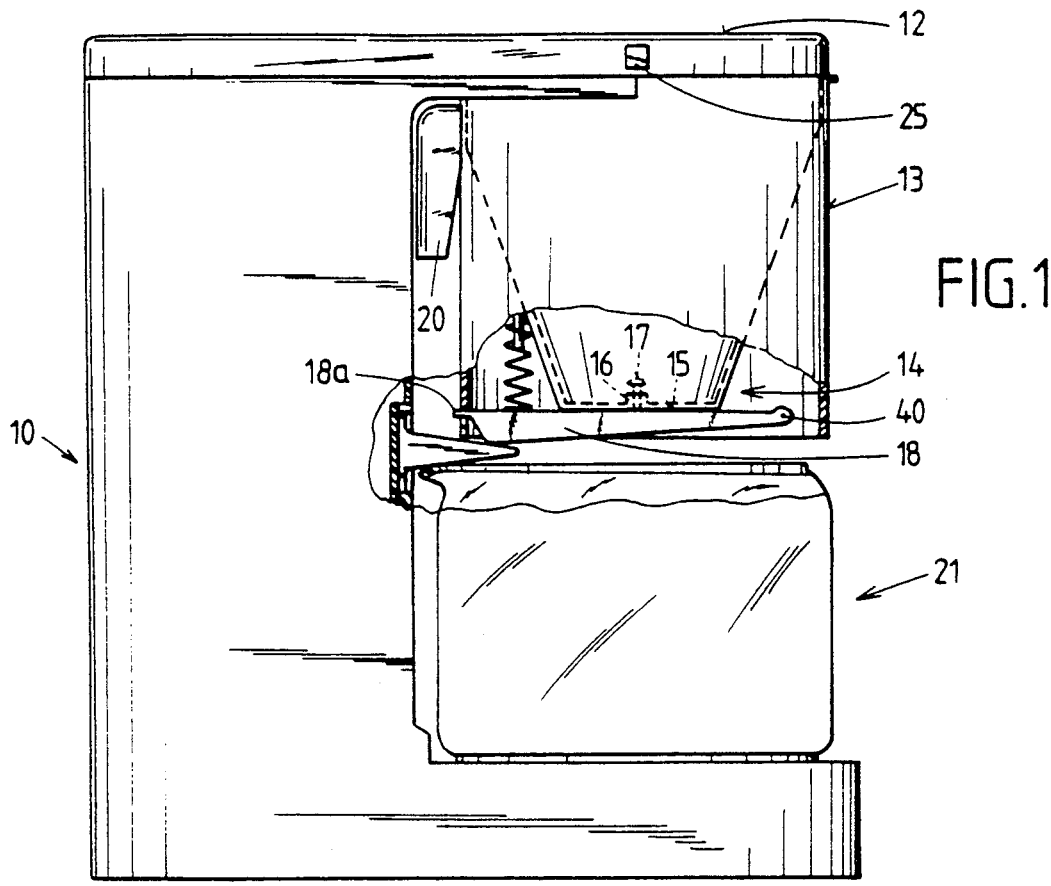
FIG. 1 is a schematic elevational view of an apparatus which can constitute a coffee making machine and employs a reciprocable actuator cooperating with a pivotable lever-like extension of the valving element in the holder for flavoring agent, the vessel being shown in fully inserted position on the support beneath the outlet of the holder.

FIGS. 1 to 5 show certain component parts of an apparatus 10 which can be used as a coffee making machine and embodies one form of the invention. The drawing shows only those parts of the improved apparatus which are necessary for complete understanding of the invention. For example, the drawing does not show an entire liquid-storing container, and the drawing does not show the conduit or conduits which serve to convey cold liquid from the container to a heating device (not shown) and from the heating device into the interior of a holder 13 on the upper portion 12 of the housing 11. In addition, the drawing does not show any of the control elements (such as buttons, knobs, switches, signal lamps and others) which are mounted in or on the housing 11. All such nonillustrated parts which are necessary for satisfactory operation of the apparatus 10 are or can be identical with the parts which are used in conventional apparatus. Reference may be had, for example, to commonly owned U.S. Pat. No. 4,888,465 (granted Dec. 19, 1989 to Hoffmann), U.S. Pat. No. 4,888,466 (granted Dec. 19, 1989 to Hoffmann), U.S. Pat. No. 4,888,467 (granted Dec. 19, 1989 to Hoffmann), U.S. Pat. No. 4,889,041 (granted Dec. 26, 1989 to Mahlich et al.) and U.S. Pat. No. 4,920,868 (granted May 1, 1990 to Gehrmann). Reference may also be had to a brochure entitled "KRUPS QUALITY BY DESIGN 1990" which describes and shows numerous commercially available coffee and tea making apparatus with heating devices, conduits, control elements and other parts which can be utilized in the apparatus of the present invention.

The housing 11 of the apparatus 10 which is shown in FIGS. 1 to 5 has a lower portion 28 (FIG. 4) and the aforementioned upper portion 12. The lower portion 28 carries a removable container 29 for fresh liquid (e.g., cold water or cold milk) which is secured to the housing 11 in any suitable manner, not shown. The container 29 (or a similar container) can form an integral part of the housing 11. The lower portion 28 of the housing 11 is substantially L-shaped; its shorter upright leg is located below the container 29 and its longer horizontal leg includes a support 24 for a removable vessel 21. The support 24 preferably constitutes or includes a warming plate which is maintained at a desired temperature by an electric heater in the interior of the lower portion 28, preferably in the hollow horizontal leg of such lower portion. Reference may be had to the aforementioned U.S. Pat. No. 4,888,465 to Hoffmann which shows a detachable container on the upright leg of the lower portion of the housing, a warming plate on the horizontal leg of the lower portion, an electric heating element beneath the warming plate, first conduits which serve to convey cold liquid from the container to the heating element, and second conduits (including a riser) which convey heated liquid from the heating element into a filter holder above the warming plate. The underside of the lower portion 28 of the housing 11 can be provided with suitable legs (not shown) which contact the upper side of a table, the upper side of a counter or the upper side of any other structure which supports the apparatus 10 in storage or in actual use.

The heating element in the lower portion 28 of the housing 11 is preferably of the type which defines a path for continuous flow of a stream of liquid from the container 29 toward and into the holder 13. The riser of the aforementioned conduit or conduits which convey heated liquid from the heating element toward and into the holder 13 can extend upwardly through the interior of the container 29 and its upper end portion is bent into a horizontal plane so that it can extend within the rather shallow upper housing portion 12 toward a location above the holder 13 where the heated liquid comes into contact with a flavoring agent, e.g., with a metered quantity of comminuted coffee beans, tea leaves or pulverulent chocolate. The upper portion 12 of the housing 12 resembles a horizontal arm which is spaced apart from and overlies the support 24 for the vessel 21. The arm carries a vertical pivot member 25 which enables the holder 13 to turn about an eccentric vertical axis between the operative position of FIG. 1 or 2 and the exposed or retracted position of FIG. 5. A handle 20 is provided to facilitate pivoting of the holder 13 between the positions of FIGS. 1-2 and FIG. 5 about the eccentric vertical axis which is defined by the shaft 25. The discharge end of the conduit in the upper portion 12 of the housing 11 is or can be located substantially centrally of the holder 13 when the latter is maintained in the position of FIGS. 1 and 2. Suitable detent means (not shown) can be provided to releasably maintain the holder 13 in the position of FIGS. 1-2 and/or in the position of FIG. 5.

Figure 2:
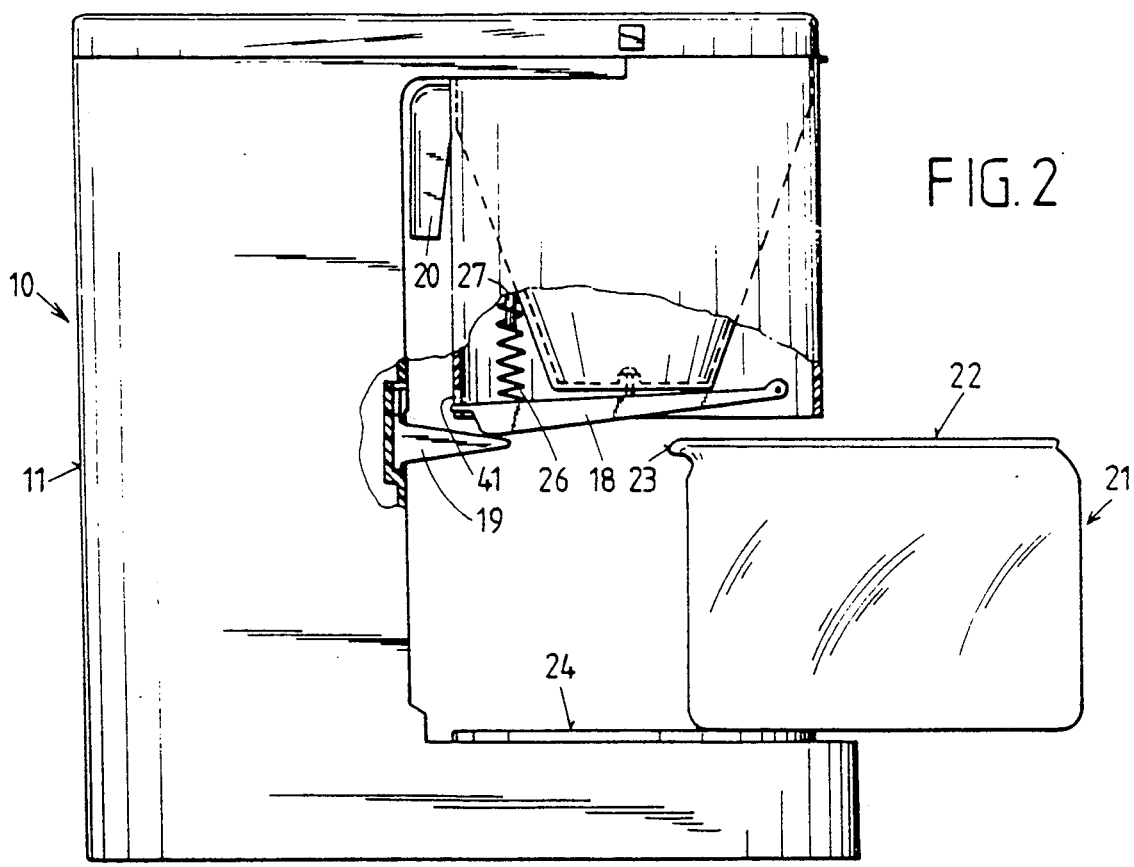
FIG. 2 shows the structure of FIG. 1 but with the vessel in partly withdrawn position in which the actuator permits the valving element to automatically assume its operative or sealing position in order to prevent hot beverage from dripping out of the holder.

The holder 13 serves to receive a standard filter 14 which, in turn, serves to receive a disposable bag of filter paper or the like for a supply of flavoring agent. Heated liquid which is discharged from the conduit in the upper portion 12 of the housing 11 flows onto the supply of flavoring agent in the filter 14 within the holder 13, and the resulting hot beverage tends to escape from the holder by way of an outlet 16 in the bottom wall 15. Such outlet is located substantially centrally of and above the open top of the vessel 21 when the latter is properly positioned on the support 24. The filter 14 is removably inserted into the holder 13, and the bottom wall 15 as well as the handle 20 are integral parts of this filter. When the filter 14 is properly installed in the holder 13, it can be considered an element or component part of the holder. For example, the filter 14 can be made of a single piece of suitable plastic material. The handle 20 is confined in the adjacent recess or niche of the container 29 or housing 11 when the holder 13 and the filter 14 therein are maintained in the positions which are shown in FIGS. 1 and 2. This ensures that the handle 20 does not or need not protrude beyond the outline of the housing 11 when the apparatus 10 is ready for use.

The vessel 21 also comprises a handle (not shown) for convenience of manipulation (see the aforediscussed U.S. Pat. No. 4,888,465 to Hoffmann).

The holder 13 contains conventional supporting elements for the properly inserted filter 14.

The flow of hot beverage through the outlet 16 in the horizontal bottom wall 15 of the holder 13 (actually in the bottom wall of the filter 14 in the holder) is controlled by a valving element 17 of standard design, e.g., a valving element which permits the beverage to flow from the interior of the holder 13 into the vessel 21 on the support 24 when the valving element is maintained in a raised or upper end position and which seals the outlet 16 when it is permitted or caused to assume its lower end position. The valve including the valving element 17 can further include one or more springs which bias the valving element to the sealing or lower end position.

Figure 3:
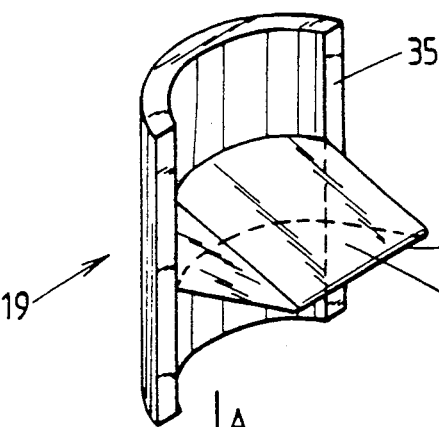
FIG. 3 is an enlarged perspective view of the actuator which is used in the apparatus of FIGS. 1 and 2.

In accordance with a feature of the invention, the valving element 17 is automatically maintained in the open or upper end position when the support 24 carries the vessel 21 but the valving element is free to seal the outlet 16 (and is preferably compelled to seal such outlet) in automatic response to removal of the vessel 21 from the support. This is achieved by the provision of an actuator 19 the details of which are shown in FIG. 3 and which cooperates with a spring-biased lever-like extension 18 of the valving element 17. Valving elements which control the outflow of hot beverage from a filter holder are shown, for example, in the aforementioned commonly owned U.S. Pat. Nos. 4,790,240, 4,811,657 and 4,843,955.

The valving element 17 is maintained in the open position when the vessel 21 assumes the position of FIG. 1, i.e., hot beverage is then free to leave the holder 13 by gravity flow and to gather in the interior of the vessel. On the other hand, the valving element 17 is held in the closing or sealing position when the vessel 21 is moved off the support 24 (FIG. 2 shows the vessel 21 in an intermediate position in which the outlet 1 in the bottom wall 15 is already sealed) or when the holder 13 is pivoted away from a position of vertical alignment with the properly supported vessel 21 (see FIG. 5). This prevents the hot beverage from flowing or dripping onto the support 24 which could result in contamination of the apparatus, in the generation of vapors and/or in damage to the apparatus if the beverage were permitted to penetrate into the hollow horizontal leg of the lower portion 28 of the housing 11.

The vessel 21 can constitute a coffee pot which is made of glass or of any other suitable material and is or can be at least partly transparent to permit immediate determination of the quantity of beverage therein. When properly positioned on the warming plate of the support 24, the vessel 21 ensures that the body of liquid therein is maintained at an optimum temperature for consumption. The warming plate of the support 24 can be heated by a discrete electric heater and/or by the aforediscussed heating element for liquid which is conveyed from the container 29 toward and into the holder 13.

The vessel 21 need not be furnished with a closure or lid, i.e., the rim 22 at the upper end of the vessel 21 can surround an open top which defines a large opening for the flow of hot beverage from the interior of the holder 13 into the vessel as soon as the latter is properly mounted on the support 24, namely as soon as the rim 22 is capable of engaging and displacing the mobile actuator 19 for the pivotable lever-like extension 18 of the valving element 17.

The rim 22 is interrupted at 23, namely, where the top of the vessel 21 is formed with a spout which facilitates controlled dispensing of hot beverage from the vessel, e.g., into a cup. The spout 23 extends to a level below the rim 22. An important feature of the invention resides in such design of the actuator 19 that the latter can be properly displaced relative to the housing 11 and container 29 by the rim 22 in spite of the fact that the rim is interrupted where the top of the vessel 21 is formed with the spout 23. Thus, it is not necessary to provide a cover for the open top of the vessel 21 because the improved actuator 19 can pivot the extension 18 of the valving element 17 in a sense to expose the outlet 16 as soon as the vessel 21 reaches the position of FIGS. 1 or 2 and irrespective of the orientation of the spout 23 relative to the housing 11, support 24 and container 29. In other words, it is immaterial whether the vessel 21 is placed onto the support 24 in such a way that its spout 23 faces to the left, to the right, toward or away from the observer of FIG. 1 or in any other direction.

The extension 18 can be considered a part of the valve which includes the valving element 17 or a part of a composite actuator which includes the actuator 19 proper. The extension 18 is an elongated lever one end portion of which movably secured to the holder 13 by connecting means 40 in the form of a horizontal shaft and the free end of which overlies the actuator 19 as long as the holder 13 is maintained in the position of FIG. 1 or 2. If the valving element 17 is a separate part which is movable relative to the extension 18, the upper side of the extension is designed to lift the valving element 17 in response to upward movement of the actuator 19, namely in response to displacement of the actuator by the rim 22 of the vessel 21 which is being pushed onto the support 24 beneath the holder 13. The valving element 17 can be permanently biased against the upper side of adjacent portion of the extension 18, e.g., by a spring (not shown) which reacts against the holder 13 or filter 14 and bears against the valving element.

The free end or tip 18a of the extension 18 is vertically movably guided in a recess 41 (e.g., in a vertical slot) in the lower portion of the holder 13. The upper side of the extension 18 is biased downwardly against the upper side of the actuator 19 by a coil spring 26 which reacts against the holder 13 and/or against the filter 14. As shown in FIGS. 1, 2 and 5, the holder 13 contains a pin-shaped retainer 27 which extends into the uppermost convolutions of the spring 26. The lowermost convolution of the spring 26 bears against the upper side of the extension 18 close to the point or line of contact between the extension and the upper side of a wedge-shaped section or follower 36 (FIG. 3) of the actuator 19. The section 36 is rigid (preferably integral) with a vertically reciprocable carrier 35 (FIG. 4) which is movable along vertical guides 33, 34 forming part of a concavo-convex wall 30 of the container 29. This wall is adjacent the support 24 (not shown in FIG. 4) and is located above the horizontal top wall 32 of the vertical leg of the L-shaped lower portion 28 of the housing 11. The edge 36a of the wedge-like section 36 of the actuator 35 is preferably somewhat longer than the width of the spout 23 (as measured in the circumferential direction of the top of the vessel 21). This ensures that the flat or slightly curved underside of the section 36 comes into abutment with the rim 22 even if the vessel 21 is pushed onto the support 24 in such a way that the spout 23 directly confronts the actuator (as actually shown in FIGS. 1 and 5); the lateral or marginal portions of the section 36 then contact the rim 22 at opposite sides of the spout 23 and the upper side of the section 36 maintains the extension 18 in an angular position in which the spring 26 is caused to store energy and the valving element 17 permits hot beverage to flow from the holder 13 into the vessel 21 on the support 24.

The exact dimensions of the section 36 would be of no particular importance if the vessel 21 were invariably placed onto the support 24 in such orientation that the spout 23 is spaced apart from the actuator 29. However, by the simple expedient of properly relating the length of the section 36 to the width of the spout 23, the vessel 21 can be placed onto the support 24 in any desired orientation, i.e., the section 36 can overlap a portion of or the entire spout 23 without affecting the ability of the actuator 19 to maintain the valving element 17 in the inoperative position, i.e., the beverage is free to flow from the holder 13 into the vessel 21.

The actuator 19 can be made of a single piece of suitable plastic material and is installed in a recess or chamber 31 behind the wall 30 of the container 29 in such a way that the edge 36a of the section 36 is located at a level slightly above the rim 22 when the underside of the carrier 35 is maintained in abutment with the top wall 32 by the spring 26 (through the medium of the extension 18). Thus, the minimum distance of the edge 36a from the support 24 is slightly more than the distance of the rim 22 from the support 24 when the latter carries the vessel 21. This ensures that, as the vessel 21 is pushed from the position of FIG. 2 toward the position of FIG. 1, the rim 22 engages the underside of the section 36 and raises the entire actuator 19 in order to compel the valving element 17 to expose the outlet 16 for the flow of hot beverage from the holder 13 into the vessel 21 on the support 24.

The wall 30 can include a portion which is used in lieu of the top wall 32 as a means for limiting the extent of downward movement of the carrier 35. However, the illustrated design is preferred at this time because the top wall 32 of the lower portion 28 of the housing 11 performs an additional useful function.

Figure 4:
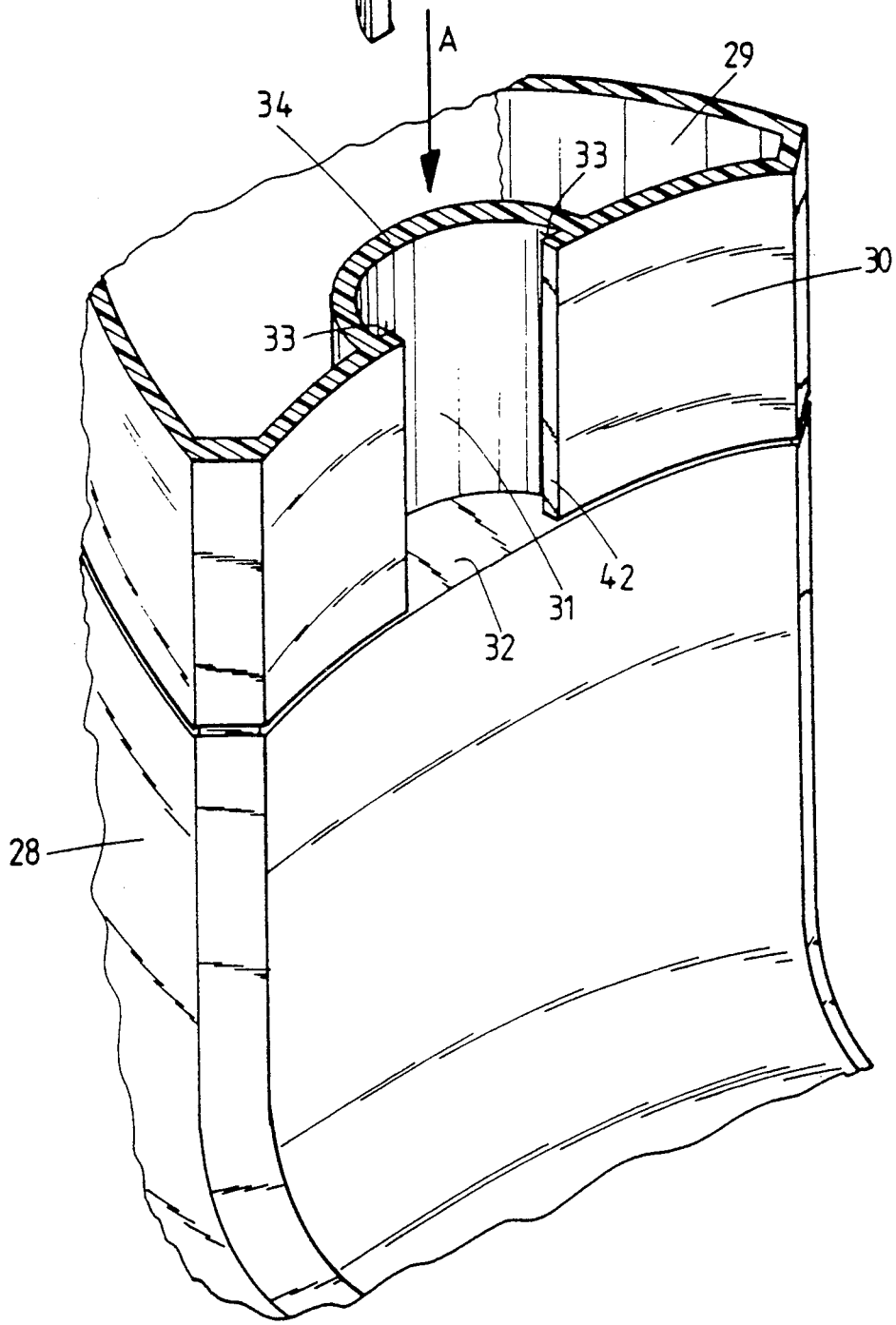
FIG. 4 is an enlarged fragmentary perspective view of those portions of the housing and liquid-receiving container which serve to guide and limit the extent of reciprocability of the actuator of FIG. 3.
Figure 5:
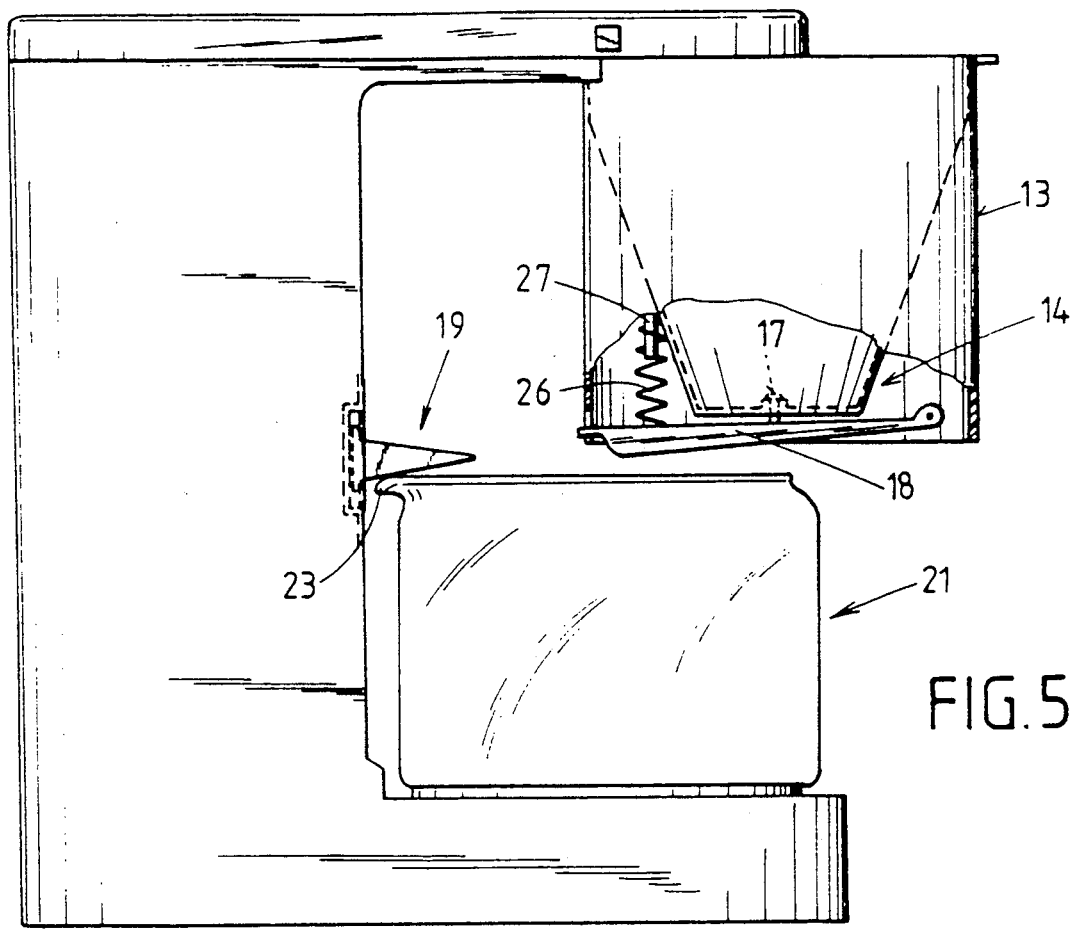
FIG. 5 is a side elevational view similar to that of FIG. 1 but showing the holder in a different position in which the valving element is free to seal the outlet of the holder even though the actuator is engaged by the rim of the vessel on the support.

If the upper end of the recess 31 behind the wall 30 of the container 29 (and above the top wall 32) is open, the actuator 19 can be inserted from above as indicated by the arrow A which is shown in FIG. 4. The guide means 33, 34 hold the carrier 35 for the section 36 against any stray movements, i.e., the actuator 19 can move up and down away from and toward abutment with the top wall 32. The wall 30 has a vertical slot 42 which communicates with the recess 31 and permits the section 36 to extend outwardly in front of the wall 30 and into the path of the rim 22 when the vessel 21 is caused to move from the position of FIG. 2 toward the position of FIG. 1 regardless of the orientation of the spout 23.

The guide means for the carrier 35 includes a pronouncedly curved portion 34 of the container 29 and two vertical strip-shaped portions 33 which define the slot 42 and are or can be integral parts of the concavoconvex wall 30 of the container 29. The two vertical edges of the carrier 35 are located behind and are slidable along the strip-shaped portions 33 of the wall 30.

If desired, the apparatus 10 can comprise one or more springs (not shown) which permanently bias the carrier 35 into abutment with the top wall 32. However, it normally suffices to rely on gravity, at least when the carrier 35 is movable in the recess 31 with a certain amount of play and the distance of the strip-shaped portions 33 from each other is at least slightly greater than the corresponding dimension of the section or follower 36. In addition, the section 36 is biased downwardly by the extension 18 (because the latter is biased by the spring 26) so that the carrier 35 automatically descends and abuts the top wall 32 as soon as the vessel 21 is moved away from the position of FIG. 1, namely as soon as the rim 22 becomes disengaged from the underside of the section 36 (or is moved sufficiently away from the position of FIG. 1 to ensure that it engages the underside of the section 36 close to the edge 36a so that the carrier 35 can descend onto the top wall 32 even if the rim 22 continues to contact the section 36).

Of course, if the spout 23 is configured in such a way that it does not extend or does not appreciably extend below the rim 22, the section 36 of the actuator 19 can be lifted by the top surface bounding such spout so that the material around the spout is also capable of engaging the section 36 for the purpose of lifting the actuator 19 and of thereby exposing the outlet 16 in the bottom wall 15.

FIG. 5 shows that escape of hot beverage from the holder 13 is prevented in automatic response to pivoting of the holder 13 from the position of FIGS. 1 or 2 even if the vessel 21 remains properly positioned on the support 24. This is due to the action of the spring 26 which causes or enables the extension 18 to move the valving element 17 to the sealing position (or to permit gravitational or spring-induced movement of the valving element to sealing position) as soon as the extension 18 is disengaged from the section 36 of the actuator 19 due to pivoting of the holder 13 about the vertical axis of the shaft 25. By moving the holder 13 to the angular position of FIG. 5, the operator can gain access to the filter 14 by way of the open upper end of the holder 13, i.e., it is not necessary to provide the upper portion 12 of the housing 11 with an opening for insertion of the filter 14 into or for withdrawal of the filter from the holder 13. The axis of the shaft 25 is eccentric to the holder 13 and the filter 14 therein.

The ability of the extension 18 to cooperate with the spring 26 and cause or permit the valving element 17 to seal the outlet 16 when the holder 13 is pivoted away from the position of FIG. 1 or 2 is attributable to the fact that the extension 18 does not directly engage any part of the vessel 21 on the support 24. All that counts is to ensure that, when the vessel 21 has been placed onto the support 24 and its rim 22 engages the section 36 to maintain the carrier 35 of the actuator 19 in raised position, pivoting of the holder 13 away from the position of FIG. 1 or 2 is sufficient to move the extension 18 away from engagement with the upper side of the section 36. The valve including the valving element 17 reopens automatically in response to pivoting of the holder 13 from the position of FIG. 5 to the position of FIG. 1 or 2 because the underside of the extension 18 then slides along the upper side of the wedge-like section 36 and the extension 18 lifts the valving element 17 to expose the outlet 16.

Figure 6:
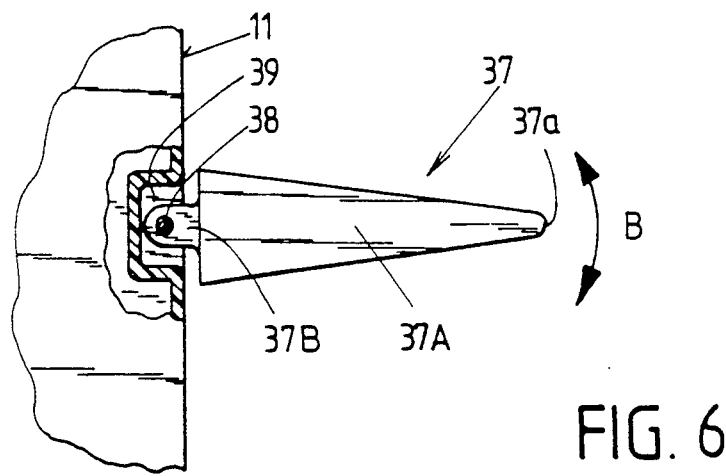
FIG. 6 is a fragmentary partly elevational and partly vertical sectional view of an apparatus which constitutes a modification of the apparatus of FIGS. 1 to 5 in that it employs a pivotable actuator for the extension of the valving element.

FIGS. 1 to 3 and 5 show an actuator 19 which is reciprocable in order to open the valve including the valving element 17 or to permit such valve to close. FIG. 6 shows a modified actuator 37 which can be used in lieu of the actuator 19 and is mounted in the housing 11 (or in the container 29 of the housing) for pivotal clockwise and counterclockwise movement about a substantially horizontal axis. The flat wedge-like main or exposed section 37A of the actuator 37 is pivotable in directions which are indicated by a double-headed arrow B, and the relatively small carrier 37B of the actuator 37 is installed in a shallow niche or recess 39 in the adjacent wall of the housing 11 and is traversed by a horizontal shaft 38 which serves as a means for movably connecting the actuator 37 to the housing. The end portions of the shaft 38 are journalled or fixedly mounted in the two vertical walls which flank the recess 39. The extent of pivotability of the actuator 37 about the axis of the shaft 38 is or can be limited by the housing 11. Thus, when permitted to pivot in a clockwise direction (as viewed in FIG. 6), the actuator 37 is ultimately arrested in an angular position in which the edge 37a of its section 37A is located at a level slightly above the rim 22 of a vessel 21 on the support 24 so that, when the vessel is moved from the position of FIG. 2 toward the position of FIG. 1 (it being assumed here that the actuator 19 of FIG. 2 has been replaced with the actuator 37 of FIG. 6), the rim 22 ultimately engages the underside of the section 37A close to the edge 37a and thereupon pivots the actuator 37 in a counterclockwise direction through an angle which is necessary to move the valving element 17 to its open or inoperative position.

It will be seen that it is immaterial whether the actuator performs a translatory or a pivotal movement (or a more complex movement). All that counts is to ensure that the rim 22 will engage the mobile actuator 19 or 37 not later than when the positioning of the vessel 21 on the support 24 is completed so that the actuator will cause the valving element 17 to permit hot beverage to escape from the holder 13. The orientation of the wedge-like section 37A of the pivotable actuator 37 of FIG. 6 with reference to the container and holder is similar to that of the reciprocable actuator 19 of FIGS. 1-3 and 5.

The level of the edge 37a of the section 37A can be selected in such a way that this edge is located slightly above the rim 22 of a vessel 21 on the support 24 when the actuator 37 assumes the neutral position of FIG. 6. The apparatus including the actuator 37 then preferably includes a suitable spring (e.g., a torsion spring) which tends to maintain the actuator 37 in the angular position of FIG. 6. The outlet 16 of the holder 13 is sealed when the actuator 37 assumes such neutral position.

Figure 10:
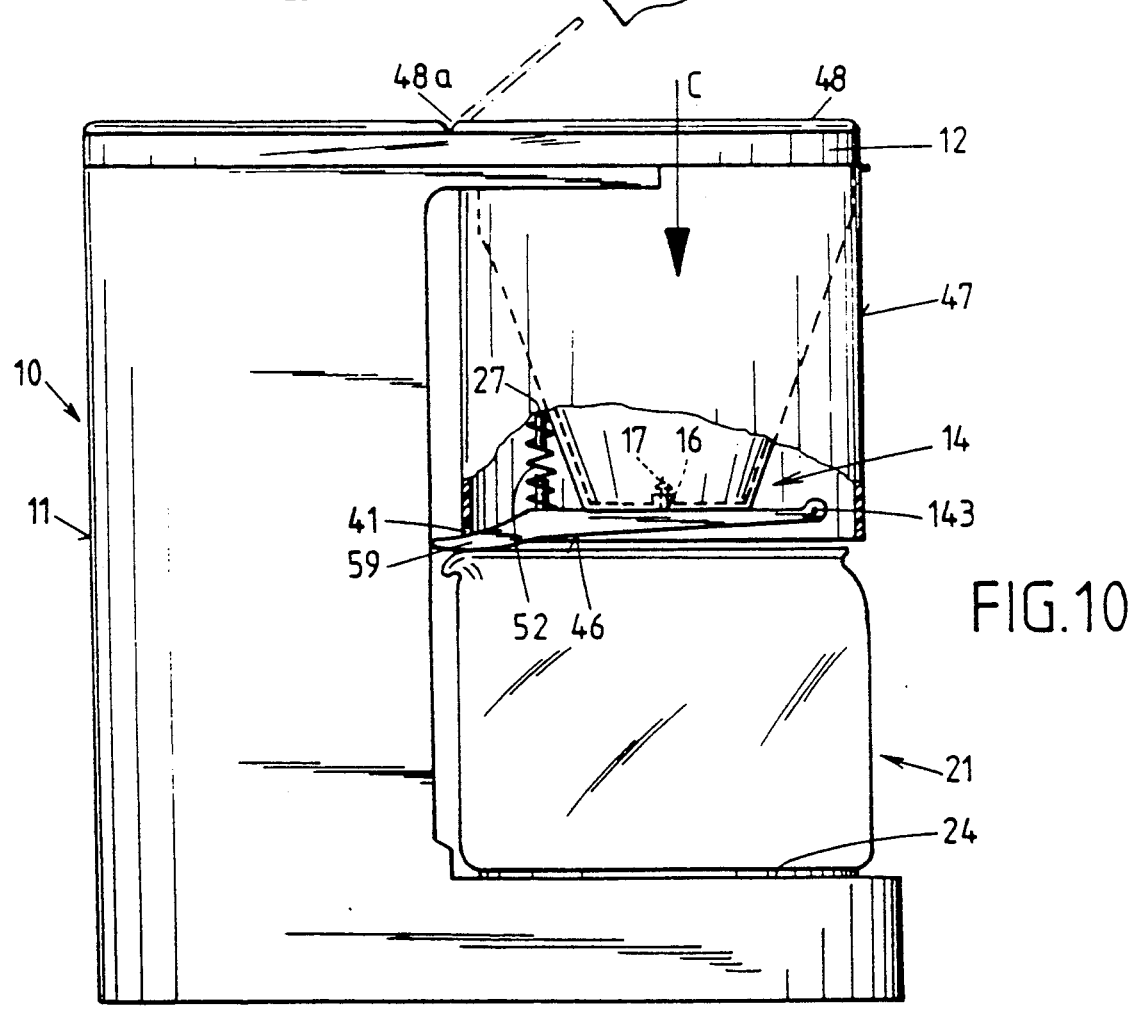
FIG. 10 is an elevational view of an apparatus which embodies the structure of FIG. 9.

FIG. 10 shows a modified apparatus (again denoted by the character 10) which does not employ a swingable or pivotable holder 13. Instead, the apparatus 10 of FIG. 10 employs a holder 47 which can be mounted on the upper portion 12 of the housing 11 in a single predetermined position. Therefore, and in order to gain access to the filter 14 in the interior of the holder 47, the upper portion 12 of the housing 11 is provided with a closure or lid 48 which is pivotable between the solid-line and phantom-line positions of FIG. 10. When the lid 48 is pivoted to the phantom-line position of FIG. 10, at least the filter bag in the filter 14 within the holder 47 is accessible for replacement (in the direction of arrow C) before the lid is returned to the solid-line closing position. The hinge for the lid 48 is located at 48a.

Since the holder 47 cannot or need not be pivoted relative to the upper portion 12 of the housing 11, the apparatus 10 of FIG. 10 employs a simpler actuator 46 which includes an elongated lever 46a pivotable about the horizontal axis of a mounting shaft 143 in the holder 47 and a plate- or panel-like follower 59 (FIG. 9) which can directly engage the rim 22 of a vessel 21 on the support 24. Thus, the extension 18 for the valving element 17 of FIGS. 1, 2 and 5 can be omitted because the actuator 46 can directly engage and displace the valving element 17 in the holder 47 when the vessel 21 is moved toward the position of FIG. 10, i.e., when the rim 22 engages the pivots the actuator 46.

The holder 47 can constitute an upright hollow cylinder which is or can be an integral part of the upper portion 12 of the housing 11. The dimensions and configuration of the filter 14 in the holder 47 are or can be the same as those of the filter 14 which is shown in FIGS. 1 and 2. The same holds true for the configuration of the outlet 16 and valving element 17.

The lever 46a of the actuator 46 is a relatively thin plate which is disposed in a vertical plane and has an eyelet 43 at one of its ends. The eyelet 43 receives a portion of the shaft 143 which is installed in the holder 47 at a location remote from the container in or on the housing 11. The panel-shaped follower 59 has two portions which are mirror symmetrical to each other and are disposed at opposite sides of the vertical plane of the lever 46a. The combined length of the two portions of the follower 59 at least equals but can at least slightly exceed the width of the spout 23 (as measured in the circumferential direction of the open top of the vessel 21). This ensures that the follower 59 invariably contacts the rim 22, even if the spout 23 is directly and fully overlapped by the follower. The underside of the follower 59 can be coplanar with the underside of the lever 46a. The upper side 50 of the lever 46a is provided with an upwardly extending retainer 51 which extends into the lowermost convolutions of a coil spring 52 which biases the actuator 46 in a counterclockwise direction (reference being had to FIG. 10). The lever 46a engages the valving element 17 substantially midway between the eyelet 43 for the shaft 143 and the retainer 51. A stop (not shown in FIGS. 9 and 10) is provided to limit the extent of pivotability of the lever 46a in a counterclockwise direction to thus ensure that the rim 22 invariably strikes the underside of the follower 59 when the vessel 21 is in the process of advancing along the support 24 and toward the position of FIG. 10, namely beneath the outlet 16 in the bottom wall of the filter 14 in the holder 47. The uppermost convolutions of the spring 52 surround the retainer 27 in the holder 47.

The underside of the follower 59 can be flat or slightly convex (see FIG. 10). This follower can be an integral part of the lever 46a.

Figure 9:
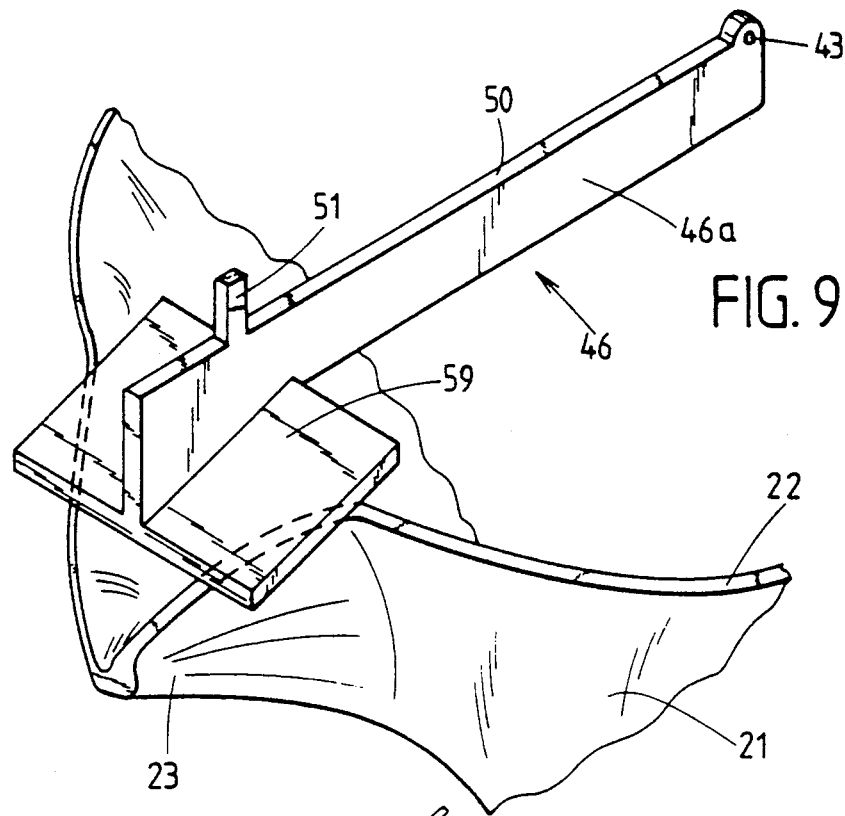
FIG. 9 is a similar perspective view but showing an actuator with a panel- or plate-like follower.

FIG. 10 shows the actuator 46 in the same angular position as in FIG. 9, i.e., the valving element 17 cannot prevent the outflow of hot beverage from the holder 47 because the rim 22 of the vessel 21 on the support 24 engages the underside of the plate- or panel-like follower 59. The spring 52 stores sufficient energy to ensure that the lever 46a is compelled to assume a position in which the valving element 17 seals the outlet 16 as soon as the vessel 21 is at least partially removed from the support 24, namely as soon as the underside of the follower 59 becomes at least partially disengaged from the rim 22 so that the lever 46a can turn in a counterclockwise direction about the axis of the shaft 143.

The lever 46a and the follower 59 can be two separately produced parts which are bonded or otherwise reliably secured to each other. As a rule, the actuator 46 will be mass-produced as a one-piece component from suitable plastic material.

Figure 7:
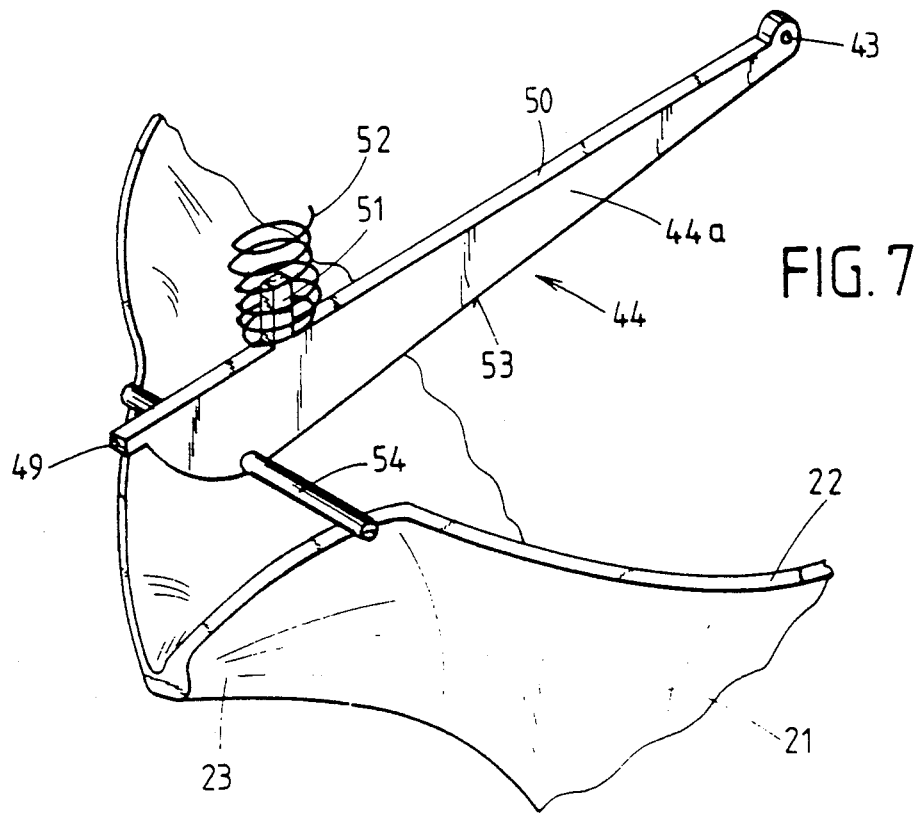
FIG. 7 is a perspective view of a portion of a third apparatus which employs a pivotable actuator having a rod-like follower and serving to directly engage the valving element in the holder for flavoring agent.

FIG. 7 shows a portion of an apparatus which constitutes a modification of the apparatus of FIGS. 9 and 10. More specifically, the one-armed lever 44a of the actuator 44 which is shown in FIG. 7 resembles a narrow wedge disposed in a vertical plane and having a flat upper side 50 and a flat underside 53. The sides 50 and 53 diverge in a direction away from the eyelet 43, namely toward an elongated rod-like follower 54 having two mirror symmetrical halves at opposite sides of the vertical plane of the lever 44a. The overall length of the follower 54 exceeds the width of the spout 23 in the open top of the vessel 21 so that at least one of the two halves of the follower 54 contacts the rim 22 when the vessel 21 is moved to a position corresponding to that shown in FIG. 10. At such time, the upper side 50 of the lever 44a (directly or indirectly) maintains the valving element 17 (not shown in FIG. 7) in open or inoperative position, i.e., hot beverage is free to flow from the holder 47 into the vessel 21 on the support 24. The free end or tip 49 of the lever 46a is guided in the slot 41 (FIG. 10) of the holder 13 or 47. The follower 54 is located between the tip 49 and the retainer 51 for the lowermost convolutions of the spring 52. This retainer, in turn, is located between the follower 54 and the eyelet 43 for the shaft 143 (not shown in FIG. 7). The lowermost portion of the follower 54 can be located close to or exactly at the level of the underside 53 of the lever 44a. The underside 53 preferably includes a convex portion which extends between the follower 54 and the tip 49. The purpose of the tip 49 is to cooperate with the surfaces flanking the recess or slot 41 in order to prevent stray movements of the follower 44 about the horizontal axis of the shaft 143.

The length of the follower 54 is a function of the width of the spout 23. This follower could be omitted if the vessel 21 were not provided with a spout 23. It is preferred to select the length of the follower 54 (and of the follower 59 of FIG. 9) in such a way that it can contact the rim 22 of a vessel 21 irrespective of the exact width of the spout 23. Thus, the apparatus can use different types of vessels with or without spouts. However, if the vessel which is placed onto the support 24 is provided with a spout, the length of the selected follower 36, 37A, 54 or 59 is preferably selected in such a way that it exceeds the maximum width of a spout. This ensures that the valve including the valving element 17 is opened by the rim 22 regardless of the orientation of the spout on the vessel 21 which has been placed onto the support 24. As a rule, a coffee pot or a tea pot will be provided with a spout to facilitate pouring of hot beverage into cups or other types of containers.

The rod-shaped follower 54 can constitute a separately produced part which is inserted into a hole in the front portion of the lever 44a. Alternatively, the follower 54 can consist of two separate halves each of which is affixed to the respective side of the lever 44a.

Figure 8:
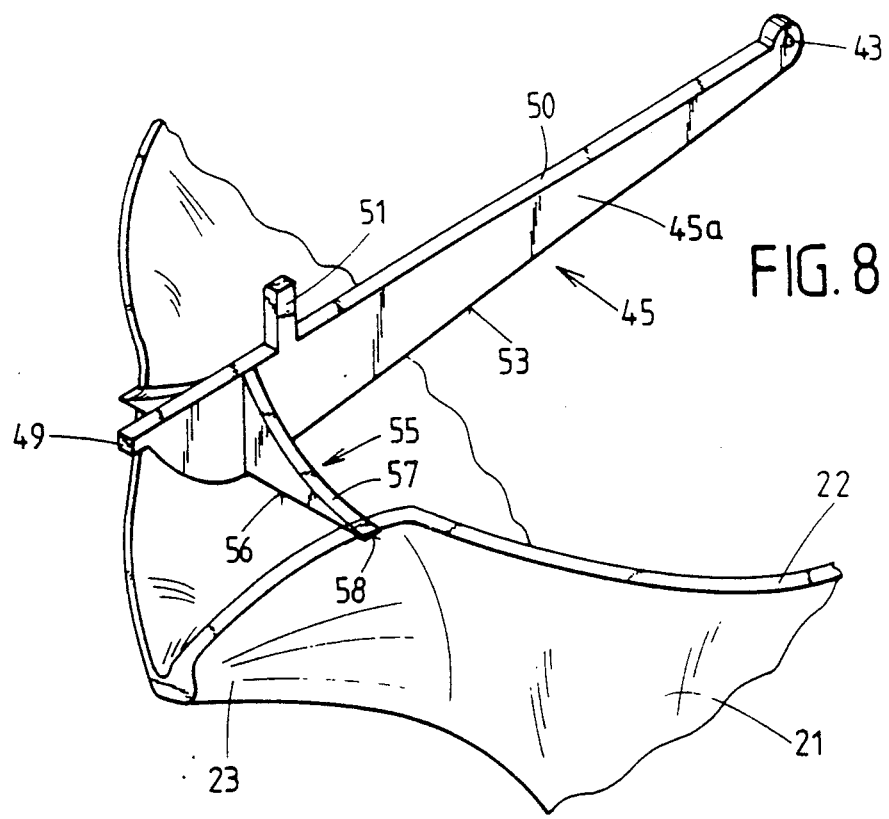
FIG. 8 is a similar perspective view but showing an actuator which includes a winged follower.

FIG. 8 shows a further modification of an actuator (45) which can be used in the apparatus of FIG. 10, i.e., in an apparatus wherein the holder (47) is maintained in a predetermined position with reference to the hosing 11. The lever 45a of the actuator 45 is identical with the lever 44a of FIG. 7 but the rod-like follower 54 of FIG. 7 is replaced with a follower having two wings 55 which are preferably mirror images of each other (to reduce the cost of the actuator) and are disposed at opposite sides of the vertical plane of the lever 45a. Each wing 55 has a plane underside 56 which is coplanar with the underside 53 of the lever 45a, and a concave upper side 57 which slopes downwardly from the adjacent portion of the lever 45a toward the tip (i.e., free end portion) 58 of the respective wing. The distance between the tips 58 of the wings 55 at least equals but preferably at least slightly exceeds the width of the spout 23. Therefore, the underside 56 of the one and/or the other wing 55 invariably contacts the rim 22 of a vessel 21 which is moved to a position corresponding to that shown in FIG. 10.

The manner of mounting the spring 52 (not shown in FIG. 8) between the retainer 51 of the lever 45a and the retainer 27 in the holder 47 is or can be the same as shown in FIG. 10.

The wings 55 can constitute integral parts of the lever 45a, and the entire actuator 45 can be made of a suitable plastic material, the same as the actuator 46 of FIG. 9. This is desirable and advantageous because a one-piece actuator can be mass produced at a low cost.

An important advantage of the improved apparatus is that it can operate properly with or without a cover for the vessel 21. The reason is that the cover cannot or need not touch the actuator in order to control the flow of hot beverage from the outlet 16 of the holder 13 or 47. Such function is performed by the rim 22 which is an integral part of the vessel 21 and cannot be lost or misplaced so that the apparatus is ready for use as long as the vessel 21 is available. The utilization of the rim 22 as a means for imparting motion to the actuator 19, 37, 44, 45 or 46 contributes to simplicity of the apparatus 10. Moreover, the forces which are generated when the rim 22 moves the follower are taken up by the sturdy body of the vessel 21 so that, if a cover is used at all, the cover can be made of a lightweight material and can be readily deformable without affecting the operation of the mechanism which includes the follower. Deformation of the vessel 21 as a result of engagement of its rim 22 with the follower of the actuator 19, 37, 44, 45 or 46 is highly unlikely.

Even though a cover for the vessel 21 is not necessary for proper operation of the actuator 19, 37, 44, 45 or 46, a cover can be provided to overlie the open top of the vessel 21 when the latter is removed from the support 24. If the cover is left on the rim 22 while the vessel 21 rests on the support 24, the stability or lack of stability of such cover is of no consequence because the rim 22 (and hence the body of the vessel 21) takes up the stresses which develop as a result of engagement with the underside of the follower 36, 37A, 54, 55 or 59. Therefore, the cover can be made of thin metallic sheet stock or other material which need not stand pronounced stresses but is used primarily or exclusively (a) to prevent penetration of contaminants into the interior of the vessel 21, particularly when the latter is removed from the support 24, and (b) to prevent premature cooling of beverage in the vessel. Irrespective of whether or not the vessel 21 is furnished with a cover, the apparatus can operate properly without a cover on the rim 22. If a cover is used, it is provided with one or more openings to permit a stream or droplets of hot beverage to flow from the outlet 16 of the holder 13 or 47 into the interior of the vessel 21 on the support 24.

The improved apparatus is susceptible of numerous additional modifications without departing from the spirit of the invention. This holds true for the design of the valve which controls the outlet or outlets 16 in the bottom wall 15 as well as for the construction and configuration of the one-piece or composite actuator for the valving element. For example, the guide means for the carrier 35 of FIG. 3 can be located at the exterior of the wall 30, and the pivotable actuator 36 of FIG. 6 can be mounted on a shaft or another suitable connecting means which is located externally of the housing 11 or its container for water or another liquid. Still further, the invention can be embodied in many other types of coffee making or other beverage brewing machines and apparatus wherein one or more outlets above a vessel for collection of hot beverage must be sealed in response to withdrawal of the vessel from a predetermined position (for reception of hot beverage) and exposed or opened as soon as the vessel reassumes its beverage-receiving position.

The configuration and/or the material of the vessel 21 or an analogous vessel can be varied in a number of ways. The vessel can be made of partly or fully transparent, translucent or opaque plastic, ceramic or other material. All that counts is to ensure that the height of the vessel is selected with a view to guarantee that the rim 22 can properly engage and move (e.g., shift or pivot) the follower of the actuator when the vessel is ready to receive hot beverage from one or more outlets above it.

The handle (not shown) of the vessel 21 can but need not be located substantially or exactly opposite the spout 23. The handle can be used to place the vessel 21 onto the support 24 in any one of a practically infinite number of different orientations. This does not prevent the rim 22 (rather than a cover or lid on the vessel 21) from properly displacing the actuator 19 or 37 or 44 or 45 or 46, irrespective of the orientation of the spout 23 relative to the actuator.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for brewing hot beverages by contacting a heated liquid with a flavoring agent, comprising a housing including a support; a liquid-confining container carried by said housing; a holder for a supply of flavoring agent, said holder being mounted on said housing and having at least one outlet disposed above and spaced apart from said support; liquid heating means in said housing; means for conveying heated liquid from said heating means to said holder so that the liquid contacts the flavoring agent and the resulting beverage tends to leave said holder by way of said at least one outlet; a valving element movable with reference to said holder between first and second positions in which said at least one outlet is respectively sealed and exposed; a vessel movable onto and off said support and having a top, a rim surrounding said top and a spout provided in and extending downwardly from said rim; and means for moving said valving element to said second position in automatic response to placing of the vessel onto said support, including a mobile actuator carried by said housing and directly contacting said rim from above irrespective of the orientation of said spout while the vessel rests on said support.

2. The apparatus of claim 1, wherein said vessel is movable onto said support in a predetermined orientation in which said spout confronts said actuator, said actuator engaging said rim at opposite sides of said spout in said predetermined orientation of said vessel.

3. The apparatus of claim 1, wherein said housing has guide means for said actuator and said actuator is reciprocable along said guide means.

4. The apparatus of claim 1, wherein said spout has a first width as measured in the circumferential direction of said top and said actuator has a second width at least matching said first width.

5. The apparatus of claim 4, wherein said actuator has a substantially flat underside which contacts said rim when said vessel is placed onto said support.

6. The apparatus of claim 4, wherein said actuator includes a rim-contacting section and a carrier for said section, said carrier being movably supported by said housing.

7. The apparatus of claim 6, wherein said carrier is rigid with said section.

8. The apparatus of claim 7, wherein said section includes a wedge-like member having an underside which contacts said rim when said vessel is placed onto said support.

9. The apparatus of claim 8, wherein said wedge-like member has an edge which is movable to a lower end position at a predetermined distance from said support, said rim being located at a lesser second distance from said support when the latter carries said vessel.

10. The apparatus of claim 6, wherein said container has a wall which is adjacent said support and an upright recess at said wall, said wall having guide means adjacent said recess and said carrier being disposed in said recess and being movable up and down along said guide means, said section being outwardly adjacent said wall.

11. The apparatus of claim 10, wherein said wall has a slot which communicates with said recess and said section extends through said slot.

12. The apparatus of claim 10, wherein said housing has a lower portion and an upper portion, said lower portion including a top wall beneath said recess, said carrier being movable to and from a lower end position of abutment with said top wall.

13. The apparatus of claim 1, further comprising means for pivotally connecting said actuator to said housing.

14. The apparatus of claim 13, wherein said housing has a chamber for said connecting means.

15. The apparatus of claim 13, wherein said actuator is a substantially flat wedge.

16. The apparatus of claim 13, wherein said connecting means defines for said actuator a substantially horizontal pivot axis.

17. The apparatus of claim 1, wherein said valving element includes an extension which is movably mounted on said holder and further comprising means for biasing said extension against said actuator.

18. The apparatus of claim 17, further comprising means for connecting said extension to said holder.

19. The apparatus of claim 18, wherein said extension includes a portion which is remote from said connecting means and is acted upon by said biasing means.

20. The apparatus of claim 19, wherein said holder has a socket and said portion of said extension is received in said socket when said vessel is placed onto said support.

21. The apparatus of claim 19, wherein said biasing means includes a spring which reacts against said holder and bears against said extension, said holder having a retainer for said spring.

22. The apparatus of claim 1, further comprising means for pivotally mounting said actuator for movement relative to said housing and said holder, said actuator having a follower which is remote from said mounting means and engages said rim when said vessel rests on said support.

23. The apparatus of claim 22, wherein said mounting means defines for said actuator a substantially horizontal pivot axis and said follower includes an elongated rod-like member which is substantially parallel t said axis.

24. The apparatus of claim 23, wherein said actuator further comprises a lever which is located in a substantially vertical plane and is pivotable about said axis, said follower being carried by and extending from said lever at both sides of said plane.

25. The apparatus of claim 24, wherein said spout has a predetermined width in the circumferential direction of the top of said vessel and said follower has a length which at least equals said width.

26. The apparatus of claim 22, wherein said actuator further comprises a lever which is pivotable relative to said mounting means about a substantially horizontal axis and said follower is remote from said axis, said follower having two substantially mirror symmetrical wings at opposite sides of said lever.

27. The apparatus of claim 26, wherein said lever has an underside and a tip, said wings being disposed between said tip and said axis and having undersides substantially coplanar with the underside of said lever.

28. The apparatus of claim 26, wherein said spout has a predetermined width in the circumferential direction of the top of said vessel and said wings have a combined length which at least equals said width.

29. The apparatus of claim 26, wherein each of said wings has a substantially plane rim-contacting underside, an end remote from said lever and a concave upper side sloping toward said underside in a direction from said lever toward the respective end.

30. The apparatus of claim 22, wherein said actuator further comprises a lever which is pivotable relative to said mounting means about a substantially horizontal axis and said follower comprises a panel rigid with said lever and remote from said axis.

31. The apparatus of claim 30, wherein said panel has portions located at opposite sides of said lever and said spout has a predetermined width in the circumferential direction of the top of said vessel, said portions of said panel having a combined length which at least equals said width.

32. The apparatus of claim 22, wherein said actuator further comprises a lever which is pivotable relative to said mounting means about a substantially horizontal axis, said follower being affixed to said lever and being remote from said axis, and further comprising means for biasing said follower against the rim of the vessel on said support, said biasing means including a spring which reacts against said holder and bears against said lever, said lever having a retainer for said spring.

33. The apparatus of claim 22, wherein said holder is mounted on said housing in a predetermined position and said actuator further comprises a lever which is pivotable relative to said mounting means about a substantially horizontal axis and carries said follower, said lever having a tip remote from said axis and said holder having an elongated guide slot movably receiving said tip.

34. The apparatus of claim 33, wherein said follower is located between said tip and said axis.

* * * * *